O. E. JOSEPH.
ROAD RECORDER AND INDICATOR.
APPLICATION FILED FEB. 24, 1919.
1,336,907.
Patented Apr. 13, 1920.
3 SHEETS—SHEET 1.
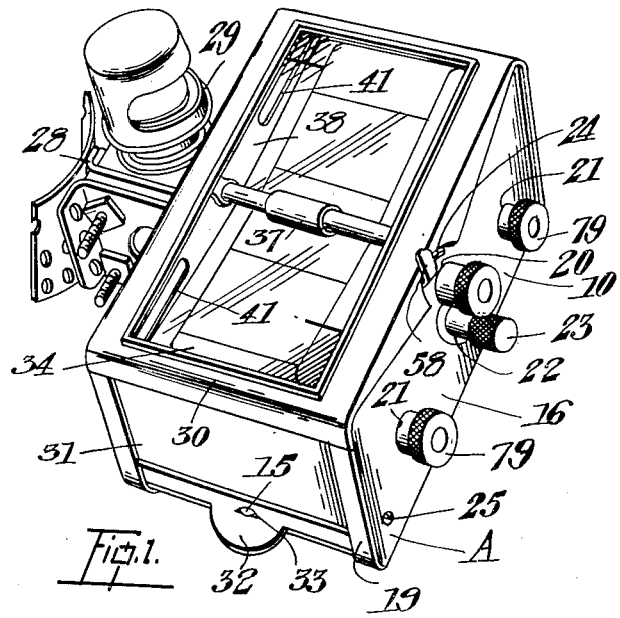
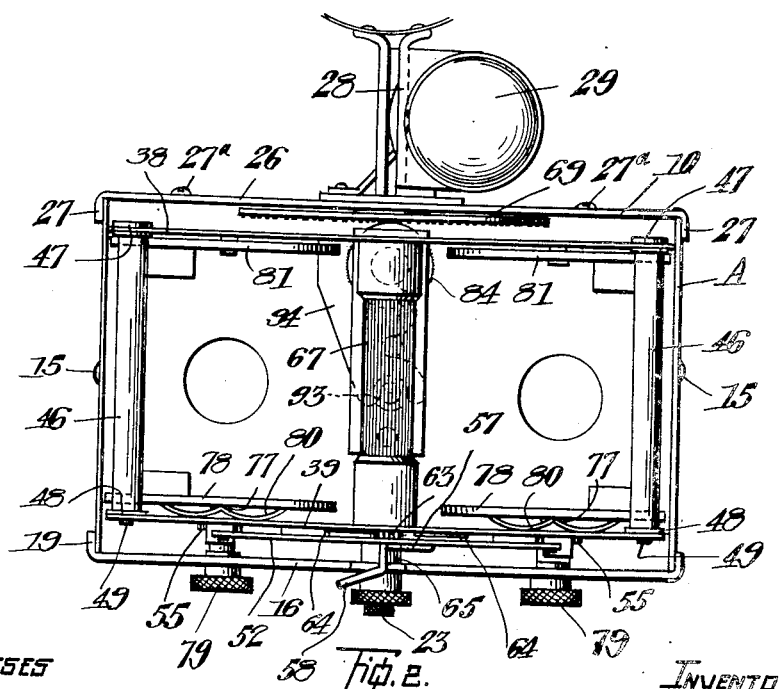
WITNESSES
INVENTOR
ORVILLE E. JOSEPH.
BY
ATT'YS.

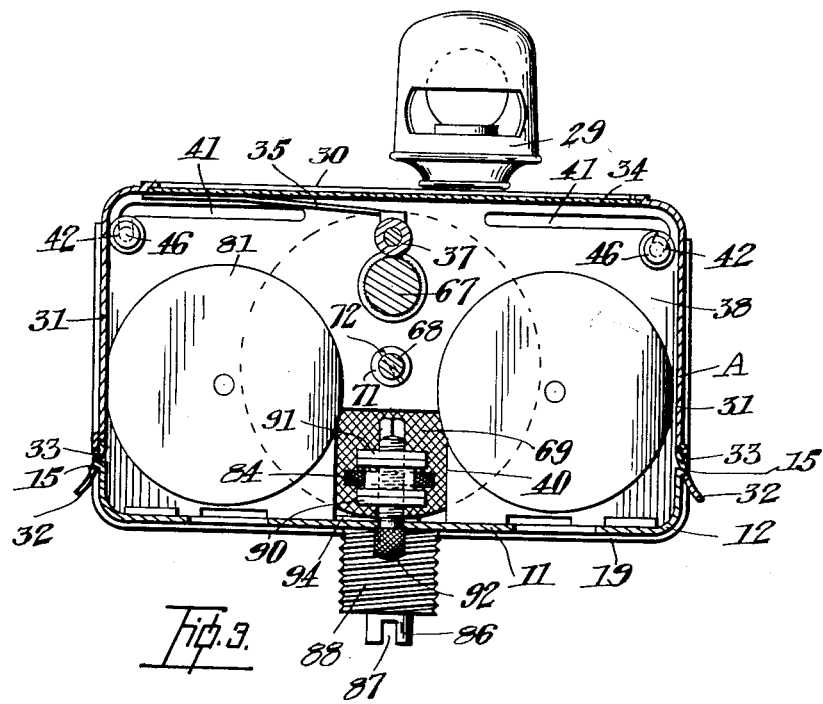
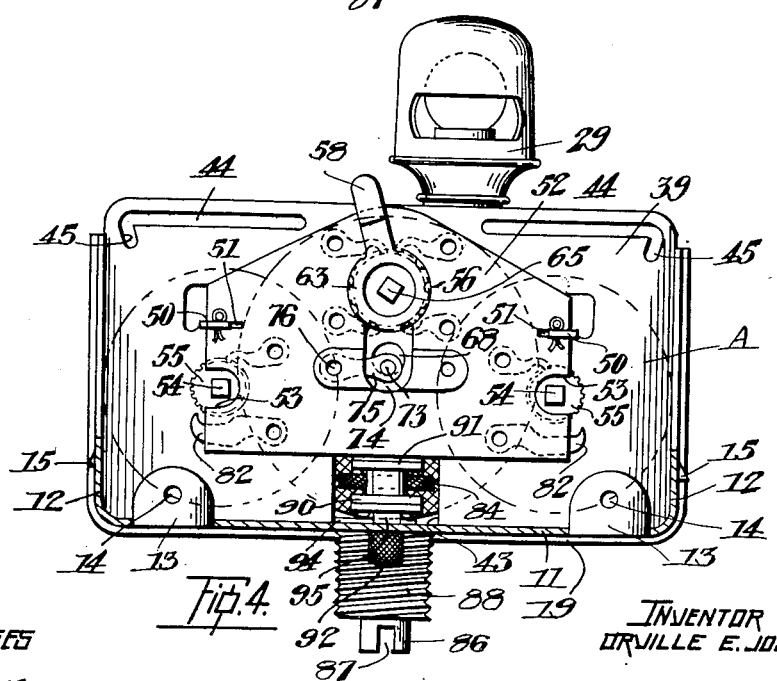

O. E. JOSEPH.
ROAD RECORDER AND INDICATOR.
APPLICATION FILED FEB. 24, 1919.

1,336,907.

Patented Apr. 13, 1920.
3 SHEETS—SHEET 3.

WITNESSES

INVENTOR
ORVILLE E. JOSEPH.

BY
ATTYS.

UNITED STATES PATENT OFFICE.

ORVILLE ERNEST JOSEPH, OF MOOSE JAW, SASKATCHEWAN, CANADA.

ROAD RECORDER AND INDICATOR.

1,336,907.   Specification of Letters Patent.   Patented Apr. 13, 1920.

Application filed February 24, 1919. Serial No. 278,888.

*To all whom it may concern:*

Be it known that I, ORVILLE ERNEST JOSEPH, a subject of the King of Great Britain, and resident of Moose Jaw, in the Province of Saskatchewan, Dominion of Canada, have invented certain new and useful Improvements in Road Recorders and Indicators, of which the following is a specification.

This invention relates to improvements in road indicators, and the objects of the invention are to facilitate traveling over roads with which the driver of a vehicle, such as an automobile, is unfamiliar, to render the device adaptable for night use, to permit of the ready correction of any slip in the recording mechanism, to simplify the mechanism and generally to adapt the device to better perform the functions required of it.

With the above and other objects in view, the invention consists essentially of the improved construction particularly described and set forth in the following specification and accompanying drawings forming part of the same.

In the drawings:

Figure 1 is a perspective view of the improved road indicator.

Fig. 2 is a plan view of the same with the cover and ends of the casing removed.

Fig. 3 is a longitudinal section through the indicator.

Fig. 4 is a front elevation, partly sectional, of the indicator, the front wall of the casing being removed to show the pawl mechanism.

In the drawings like characters of reference indicate corresponding parts in all the figures.

Figure 6:
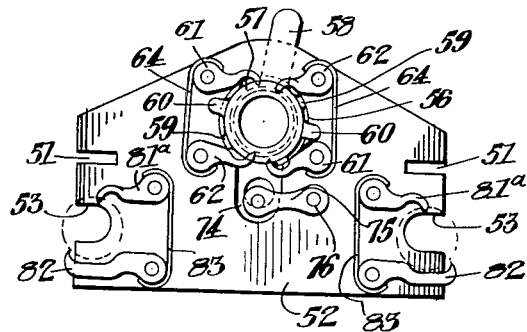
Fig. 6 is a rear elevation of the plate carrying the pawl mechanism.
Figure 5:
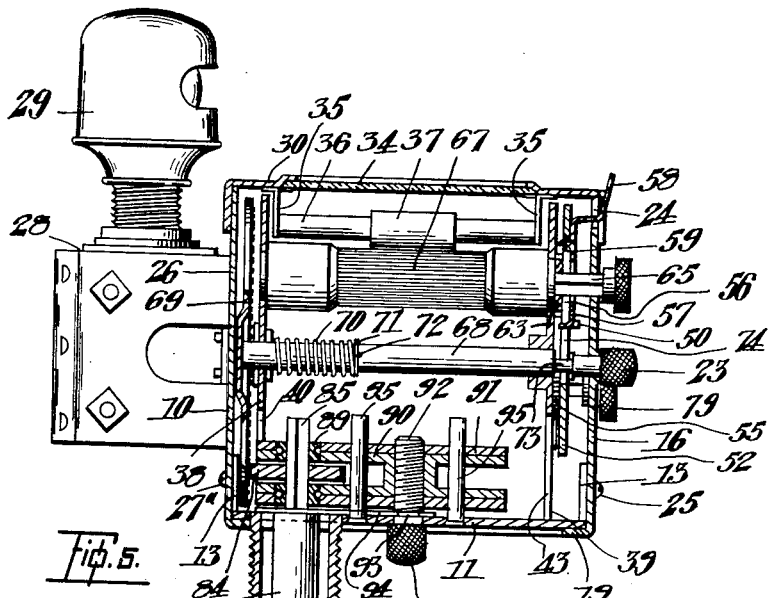
Fig. 5 is a transverse section through the indicator.
Figure 7:
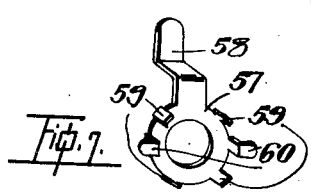
Fig. 7 is a perspective view of the lever designed to coact with the pawl mechanism and control the regulation of slip in the indicator tape and reverse the travel of the tape instrument.
Figure 8:
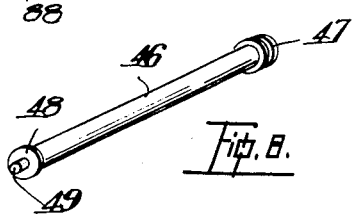
Fig. 8 is a perspective view of one of the tensioning rollers.

Referring to the drawings, A represents the improved indicator comprising a casing 10 constructed with a bottom wall 11 having the ends 12 upturned, the said bottom wall being provided on the longitudinal edges with upwardly extending tongues 13 having threaded orifices 14 therethrough.

The upturned ends 12 of the bottom wall are provided intermediate of their length with projections 15, the object of which will be made clear hereafter.

The front wall 16 of the casing is provided with a flange 19 extending around three edges thereof and is formed with orifices 20, 21 and 22 through the last of which the set screw 23 is threaded.

The upper edge of the front wall 16 is provided with a recess 24, the lower edge of which is arcuate, and this wall is secured to the tongues 13 on the front edge of the bottom 11 by means of screws 25 or the like.

The rear wall 26 of the casing is provided with a flange 27 extending around three edges thereof and is secured to the tongues 13 at the rear edge of the bottom 11 of the casing by means of screws 27ª, the said back wall carrying a clamp 28 which is adapted to support a lamp holder 29 for night use.

The top 30 and end walls 31 of the casing are formed integrally, the end walls being provided intermediate of their breadth with finger grips 32 having orifices 33 therein adapted to engage with the projections 15 on the upturned ends 12 of the bottom 11.

The top 30 is formed with a window frame having a covering 34 of transparent material such as glass, and this cover is provided with a pair of longitudinally extending springs 35 carrying a transversely extending rod 36 rotatably mounted therein, which rod is provided intermediate of its length with a rubber roller 37.

The casing 10 houses the mechanism which is operatively supported by the two spaced plates 38 and 39, the former of which is provided intermediate of its length with a rectangular recess 40 and is formed adjacent to its upper edge with a pair of longitudinally extending slots 41 which terminate at their outer ends in angularly downwardly disposed, converging notches 42.

The front plate 39 is provided with a rectangular slot 43 in the lower edge and is formed adjacent to its upper edge with longitudinally extending slots 44 which terminate in angularly disposed and downwardly extending converging notches 45, the slots 44 being arranged directly opposite to the slots 41, so that the rollers 46 may be journaled in the said slots.

The rear end of each of the rollers 46 is provided with a recess 47 forming shoulders which engage with the opposite faces of the rear plate 38, and permit of the rollers being rotated along the slots 41 to and from the center of the casing. The outer end of each roller 46 is provided with a shoulder 48 and a reduced projecting pin 49 which engages with the slots 44 in the front plate 39.

The plate 39 is also provided intermediate of its height with a pair of tongues 50 adapted to engage with slots 51 in the plate 52 which carries the pawl mechanism of the indicator. The plate 52 is provided in its vertical edges below the slots 51 with recesses 53 arranged in alinement with a central opening 54 of the ratchet wheels 55 which are journaled in the front plate 39.

The plate 52 is further provided adjacent to the top edge with an orifice 56 in which the hub 57 of the lever 58 is rotatably mounted. This hub 57 is provided with a plurality of offset fingers 59, and carries a pair of diametrically oppositely arranged arms 60, the fingers being designed to engage with a periphery of the orifice 56 and so center the hub, and are adapted to engage with the pawls 61 and 62 pivotally supported on the plate 52, while the arms 60 prevent lateral displacement of the hub.

The pawls 61 and 62 are arranged in pairs, diametrically opposite each other and while the pawls 61 are engaged with the ratchet wheel 63 the pawls 62 will be disengaged therefrom, but by rotating the lever 58 the fingers 59 will disengage the pawls 61 from the ratchet wheel 63 and allow the pawls 62 to engage therewith.

The lever 58 is offset intermediate of its length and this offset end is accommodated in the slot 24 formed in the front wall 16 of the casing 10. The pawls 61 and 62 are controlled by the springs 64, and by reference to Fig. 6 of the drawings it will be seen that one pawl 61 and one pawl 62 is controlled by each spring, and the releasing of the pawls is controlled by the actuation of the lever 58 and the coaction of the fingers 59 with pairs of oppositely disposed pawls.

The ratchet wheel 63 is rigidly fixed to the spindle 65 of the transversely extending roller 67 which is journaled in the front and rear plates 38 and 39 of the indicator, the said roller being reduced intermediate of its length, and the reduced portion is provided with a serrated surface adapted to increase the gripping power of the roller.

The roller 67 coacts with the roller 37 and a tape passes between the said rollers which are designed to feed the tape through predetermined distances as the automobile or vehicle on which the indicator is mounted travels along a certain road.

The roller 67 is a positive drive roller and the roller 37 a friction roller which holds the tape in close contact with the first said roller.

A spindle 68 is journaled in the front and rear plates 38 and 39, the rear end of the spindle projecting through the rear plate and carrying a disk 69 having a roughened or milled face. The spindle 68 is capable of longitudinal movement, and is provided with a spring 70 which is located between the inner face of the rear plate 38 and the washer 71 which is secured in position on the spindle by a pin 72.

It will be clear therefore that as pressure is brought to bear on the spindle 68 it will be displaced longitudinally, but on the pressure being removed the spring 70 will tend to return the spindle to its normal position.

The front end of the spindle 68 is provided with a projecting pin 73 which is arranged eccentrically to the longitudinal axis of the spindle, and this pin bears against the end of the set screw 23 which on manual adjustment will move the spindle to a minute degree in longitudinal direction.

The orifice 56 of the plate 52 is provided with a downwardly extending U-shaped recess 74 through which the pin 73 extends, and this pin is connected by a link 75 with a projection 76 on the plate 52. It will be clear that on rotary motion of the spindle 68, a reciprocating motion is given to the plate 52 by the link 75.

The ratchet wheels 55 are rotatably mounted in the front plate 39 and through the axial openings 54 of the ratchet wheels, the spindles 77 extend. The inner ends of the spindles 77 are formed with disks 78 while the outer ends pass through the orifices 21 in the front wall 16 of the casing and are fitted with milled heads 79, whereby the spindles may be rotated manually in a predetermined direction.

The disks 78 are spaced from the front plate 39 by the springs 80 and directly opposite the disks 78, disks 81 are rotatably mounted on the rear plate 38, so that the disks 78 and 81 are arranged in pairs which each accommodate a reel therebetween.

As the plate 52 is reciprocated the pawls 81ª and 82 are engaged with the ratchet wheels 54 and rotate the same in a predetermined direction, and these wheels in turn rotate the spindles 77 and disks 78 which thus rotate the reels located between the pairs of disks 78 and 81.

The disks 78 rotate in outward and opposite directions and thus keep the tape on the reels in tension, and the tape is positively pulled by the rollers 67 and 37 from one reel and fed on the other reel.

The pawls 81a and 82 are controlled by the springs 83. The disk 69 is designed to be rotated by the wheel 84 which is slidably mounted on the rectangular spindle 85, the lower end 86 of which is enlarged and provided with a transversely extending slot 87 whereby the spindle is operatively connected to a driving means.

The enlarged portion of the spindle is housed in a casing 88 provided with a peripheral thread to which a flexible shaft or an electrical driving means may be connected to hold the driving means in engagement with the slot 87, and so transmit rotary motion of the spindle 85.

The periphery of the wheel 84 is milled or roughened to frictionally engage with the roughened face of the disk 69 and thus transmit a rotary motion of the disk without any slip.

The spindle 85 slidably engages with the bearings 89 carried by the bifurcated arms 90 of a bracket 91, which makes threaded engagement with a set screw 92. The set screw 92 is prevented from making longitudinal movement by having the neck recessed as shown at 93 which recess is engaged by a plate 94, so that on rotation of the set screw the bracket 91 is moved upwardly in the casing 10 with the result that the wheel 84 will be displaced radially on the disk 69, and the speed of the said disk will be altered by adjusting the said screw.

The bracket 91 is slidably mounted on the pins 95 carried by the bottom of the casing, so that during any displacement of the bracket, the wheel 84 will always be in alinement with the squared spindle 85 and there will be no tendency of binding taking place in the drive of the indicator.

The bottom of the casing is also provided with a pair of orifices located below the reels which are embraced by the disks 78 and 81 and these orifices allow of the fingers being inserted into the casing to remove the reels when a new tape is being positioned in the indicator.

When the indicator is in use it is clamped in a position adjacent to the hand wheel of an automobile and is at all times under the direct observation of the chauffeur or driver.

If a certain journey is being made on an automobile fitted with this device, a reel having wound thereon a tape indicating the journey to be made is mounted between one pair of disks 89 and 81 and frictionally held therebetween by the spring 80. The free end of the tape is then placed over one of the guide rollers 46, between the rollers 67 and 37, around the other guide roller 46 and attached to a second reel carried by the second pair of disks 78 and 81.

During this primary arrangement of the tape the guide rollers 46 are slid along the slots 44 and 41 toward the center of the casing, so giving plenty of slack on the tape to arrange the same, and when the free end of the tape is connected to the second reel the guides 46 are forced toward the outer ends of the slots and are forced down into the offset ends 42 and 45, in which position the guide rollers are locked, although they are still capable of rotary motion.

The spindle 86 is now connected to a flexible shaft or an electrical drive which is designed to rotate the spindle at a certain definite ratio to the rotation of the front wheels of the automobile, so that as the automobile proceeds on its journey a definite rotation of the spindle 86 will take place, with the result that the tape will be dispersed or pulled from one reel and fed on the other reel. As the tape travels under the window 34 it will display the cross roads and places of interest on the journey and the window may be marked with indicator points which coincide with the places of interest as they are reached on the journey. The rotation of the spindle 86 rotates the wheel 84 which by coaction with the disk 69 rotates the spindle 68, which in turn, through the pin 73, reciprocates the plate 52, and at each reciprocation of the plate 52, the pawls 81a and 82 rotate the ratchet wheels 55 positively, so that the disks 78 are positively rotated in an outward or opposite direction.

The tape feeding mechanism is the drive roller 67 and coacting idle roller 37. The disks 78 are rotated in opposite outward directions by the pawls and ratchet wheels, so that the tape is pulled from one reel and fed on the other. When the tape is moving from one reel to the other under the glass cover 34 provided with the index marks, the spring 80 causes sufficient friction between the tape reel and disk 78 to take up the slack of tape, as it is pulled from the unwinding reel by the drive roller 67 and idler 37. The spring 80 engaging the disk 78 of the unwinding reel is designed to cause sufficient friction between the said disk and reel to keep the tape tight, so that it will wind and feed squarely with the winding reel.

On the return journey it is necessary to reverse the action of the drive roller 67 and this is done by actuating the lever 58, the fingers 59 of which control the pawls 61 and 62 coacting with the ratchet wheel 63, and permit of the roller being turned in the desired direction and thus the unwinding reel becomes the winding reel.

Should any slip take place in the tape and it is desired to correct the same, this may be done by rotating the roller 67 to bring the mark of the tape under the indicator mark on the cover 34.

Should it be found necessary at any time to adjust the contact of the wheel 84 and the disk 69, this may be done by adjusting the set screw 23 which will move a spindle 68 longitudinally against the action of the spring 70 and allow the degree of contact to be varied between the said wheel and disk. The radial displacement of the wheel 84 relatively to the disk 69 corresponds with the speed of travel of the automobile, so that it is only necessary to rotate the set screw 92 which will force the bracket 91 inwardly into the casing, and so displace the wheel 84 relatively to the disk 69 and thus causing the disk to be rotated quicker or slower as found necessary.

The lamp holder 29 is connected to a suitable source of electric power, and the light from the lamp is reflected on the window 34 so that the tape, as it is being unwound from one wheel on to another, is readily discernible even at night time.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A device of the class described comprising a casing, reel supporting elements in the casing, a feed roller between the reel supporting elements, means for actuating the roller, and means for simultaneously rotating the said reel supporting elements in opposite directions.

2. A device of the class described comprising a casing, reel supporting elements in the casing, a feed roller between the reel supporting elements, means for rotating the roller, means for simultaneously rotating the reel supporting elements in opposite directions, guide rollers in the casing designed to be moved inwardly into the casing, and means for locking the guide rollers in an outward position.

3. A device of the class described comprising a casing, plates in the casing having elongated slots at the upper end terminating at the outer ends in downwardly disposed notches, reel supporting elements carried by the plates, guide rollers mounted in the slots, a feed roller between the reel supporting element, means for rotating the roller, and means for simultaneously rotating the reel supporting elements in opposite directions.

4. A device of the class described comprising a casing, plates spaced in the casing, reel supporting elements carried by the plates, resilient means for pressing the reel supporting elements inwardly, a feed roller between the reel supporting elements, means for rotating the roller, and means for simultaneously rotating the said reel supporting elements in opposite directions.

5. A device of the class described comprising a casing, reel supporting elements in the casing, pawl and ratchet means for simultaneously rotating the reel supporting elements in opposite directions, a feed roller intermediate of the reel supporting elements, a ratchet wheel on the feed roller, pawls coacting with the said ratchet wheel, and a lever controlling the operation of the pawls whereby the rotation of the feed roller is reversed.

6. A device of the class described comprising a casing, reel supporting elements in the casing, a feed roller between the reel supporting elements, means for rotating the roller, resilient means for pressing the reel supporting elements toward each other to frictionally retain a reel therebetween, a shaft extending transversely across the casing, a disk on the shaft, a roller coacting with the disk, means for displacing the roller radially relatively to the disk, means for controlling end motion of the shaft whereby the contact of the roller and disk is adjusted, and means for simultaneously rotating the reel supporting elements in opposite directions.

7. A device of the class described comprising a casing, reel supporting elements in the casing, a feed roller intermediate of the reel supporting elements, means for rotating the feed roller, means for reversing the rotation of the feed roller, a pressure roller coacting with the feed roller, and means for rotating the reel supporting elements simultaneously in opposite directions.

8. A device of the class described comprising a casing, a shaft mounted in said casing, means for moving the shaft endwise, resilient means controlling the movement of the shaft, a disk on the shaft, a roller coacting with the disk, a frame carrying the roller, means for moving the frame inwardly into the casing, guide means coacting with the frame, reel supporting elements arranged on opposite sides of the transverse shaft, a feed roller between the reel supporting elements, means for rotating the roller and means for rotating the reel supporting elements simultaneously in opposite directions.

9. A device of the class described comprising a casing, reel supporting elements in the casing, a feed roller between the reel supporting elements, means for rotating the roller, ratchet wheels on the reel supporting elements, a plate, pawls mounted on the plate designed to coact with the ratchet wheels, the said pawls being arranged in pairs, springs controlling each pair of pawls, and link means for reciprocating the plate whereby the reel supporting elements are rotated simultaneously in opposite directions.

In witness whereof I have hereunto set my hand in the presence of two witnesses.

ORVILLE ERNEST JOSEPH.

Witnesses:
SADIE READING,
ETHEL KNAGGS.